United States Patent [19]

Bryson et al.

[11] Patent Number: 4,509,878
[45] Date of Patent: Apr. 9, 1985

[54] WINDSHIELD WIPER TRANSMISSION

[75] Inventors: Bruce A. Bryson, Arcanum; Jeffrey J. Buschur, Xenia, both of Ohio

[73] Assignee: General Motors Corporation, Detroit, Mich.

[21] Appl. No.: 505,179

[22] Filed: Jun. 17, 1983

[51] Int. Cl.³ .......................... F16B 9/00; G12B 9/00; B60S 1/08; B23P 19/02
[52] U.S. Cl. ...................... 403/71; 403/197; 403/199; 15/250.27; 29/525; 29/526 R; 29/432; 248/27.1; 248/222.2
[58] Field of Search ............... 403/71, 194, 195, 197, 403/199, 201, 238; 248/27.1, 73, 222.1, 222.2; 15/250.34, 250.27; 29/525, 526 R, 432

[56] References Cited

U.S. PATENT DOCUMENTS

| 2,379,752 | 7/1945 | Schultz | 403/408 |
| 2,699,909 | 9/1951 | Turk | 403/194 |
| 3,153,802 | 10/1964 | Howard | 15/250.27 |
| 4,314,220 | 2/1982 | Ito et al. | 248/222.2 |

FOREIGN PATENT DOCUMENTS

| 3123859 | 12/1982 | Fed. Rep. of Germany | 15/250.34 |
| 145256 | 7/1920 | United Kingdom | 248/73 |
| 705442 | 3/1954 | United Kingdom | 15/250.27 |
| 1448892 | 9/1976 | United Kingdom | 15/250.34 |
| 943038 | 7/1982 | U.S.S.R. | 15/250.27 |

Primary Examiner—Cornelius J. Husar
Assistant Examiner—Todd G. Williams
Attorney, Agent, or Firm—Saul Schwartz

[57] ABSTRACT

A mounting for a windshield wiper pivot shaft on a vehicle cowl panel includes a transmission having a housing defining a base surface and a tower projecting from the base surface, a bore through the tower for rotatably supporting the pivot shaft, a rectangular aperture in the cowl panel having a pivot edge, a circular aperture in the cowl panel overlapping the rectangular aperture, a lip on the housing at one end of the base surface, and protuberances on the housing on an imaginary circle having a radius corresponding to but slightly larger than the radius of the circular aperture. The transmission is mounted on the cowl panel by inserting the tower through the overlapped apertures, hooking the lip on the pivot edge, and pivoting the housing toward the cowl panel so that the protuberances engage the circular aperture in interference fit fashion to remove all clearance between the transmission and the cowl panel when the base surface abuts the cowl panel.

5 Claims, 6 Drawing Figures

WINDSHIELD WIPER TRANSMISSION

BACKGROUND OF THE INVENTION

1. Field of the Invention

This invention relates generally to windshield wiper systems and, more particularly, to a new and improved pivot shaft transmission and method of mounting the same on a body panel.

2. Description of the Prior Art

In typical automotive windshield wiper systems, individual wiper arms are attached to corresponding pivot shafts rotatably supported on transmissions mounted on a body panel below the windshield. Motive force is supplied by a drive link to one pivot shaft and movement of the wiper arms is synchronized by a cross link between the pivot shafts. Typically, the transmissions are aligned with appropriate apertures in the body panel and fastened thereto with a plurality of fasteners in a manual assembly operation similar to assembly operations encountered in the electronic instrument field where various components having rotatable control shafts are attached to a chassis. In one proposal to simplify the assembly procedure in the electronic instrument environment, an appropriately key-shaped component has a lip which engages an edge of a correspondingly key-shaped panel aperture to provide a fulcrum for pivoting the component to an assembled position in the aperture, the key shapes preventing rotation of the component in the aperture. As the component pivots to the assembled position the lip bends the edge of the panel causing the edges of the aperture to contract and tightly grip the component. This arrangement, while satisfactory in its environment, lacks applicability to windshield wiper systems because forces of considerably higher magnitude and panels of much heavier gage material are encountered in the latter environment. Other attachment proposals involving antenna mounts on vehicle body panels and anchor bolts on structural panels employ similar pivotal installation steps and key-shaped apertures. These latter proposals, however, are also inappropriate in a windhshield wiper environment because in the antenna arrangement a large clamping nut is required around the antenna and in the bolt arrangement the bolt is not positively held in position. A windshield wiper transmission according to this invention represents an improvement over these and other similar proposals in that rigid attachment to the panel is automatic and requires only a single threaded fastener.

SUMMARY OF THE INVENTION

Accordingly, the primary feature of this invention is that it provides a new and improved windshield wiper transmission and method of mounting the same on a vehicle body panel. Another feature of this invention resides in the provision in the new and improved transmission of a housing which rotatably supports a pivot shaft and which has a lip engageable on an edge of a panel aperture for pivoting the housing to an installed position and in the provision of vertical edges on the housing which effect interference engagement with datum edge points around the aperture in the installed position of the housing to eliminate clearance between the housing and the aperture. Still another feature of this invention resides in the provision in the new and improved transmission of a lip on the housing disposed a predetermined distance from a pivot shaft supporting tower on the housing and in the provision of one vertical edge on the opposite side of the tower and two more vertical edges at about 90° on either side of the one vertical edge so that in the installed position of the housing clearances are eliminated and the housing is tightly captured in the aperture.

These and other features of this invention will be readily apparent from the following specification and from the drawings wherein.

Figure 1:
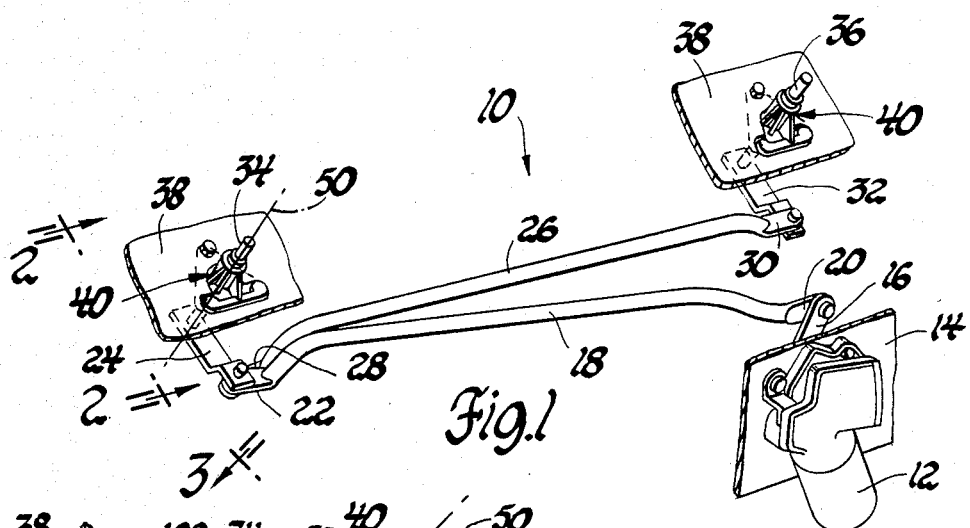
FIG. 1 is a fragmentary perspective view of a vehicle windshield wiper system having a transmission according to this invention.

Referring now to FIG. 1 of the drawings, a fragmentarily illustrated windshield wiper system 10 includes a motor drive 12 rigidly attached to a vertical panel 14 which normally defines the rear wall of the vehicle engine compartment. The motor drive 12 has a shaft, not shown, projecting through the panel 14 and rigidly supporting therebehind an arm 16 which rotates with the shaft about an axis of the motor drive. A drive link 18 has a first end 20 pivotally connected to the distal end of arm 16 and a second end 22 pivotally connected to a distal end of a left side crank arm 24. A cross link 26 has a first end 28 pivotally connected to the distal end of left side crank arm 24 and a second end 30 pivotally connected to the distal end of a right side crank arm 32. A left side pivot shaft 34 is rigidly connected to the left side crank arm 24 and a right side pivot shaft 36 is rigidly connected to the right side crank arm 32. The right and left side pivot shafts 36 and 34, respectively, project outwardly through a cowl panel 38 located below a front windshield, not shown, and each carries a windshield wiper arm, also not shown.

In conventional fashion, when the motor drive 12 is actuated, the arm 16 rotates causing the drive link 18 to oscillate laterally. As the drive link oscillates the left side crank arm 24 angularly oscillates between extreme positions, not shown, causing corresponding oscillation of pivot shaft 34 and attached wiper arm. The cross link 26 transfers motive force from the drive link 18 to the right side crank arm 32 and synchronizes angular oscillation of the right side crank arm with that of the left side crank arm 34 so that the wiper arm attached to pivot shaft 36 operates in unison with the wiper arm attached to pivot shaft 34. The left and right side pivot shafts 34 and 36, respectively, are rotatably supported on the cowl panel 38 by a pair of identical transmissions according to this invention and designated generally 40.

Figure 2:
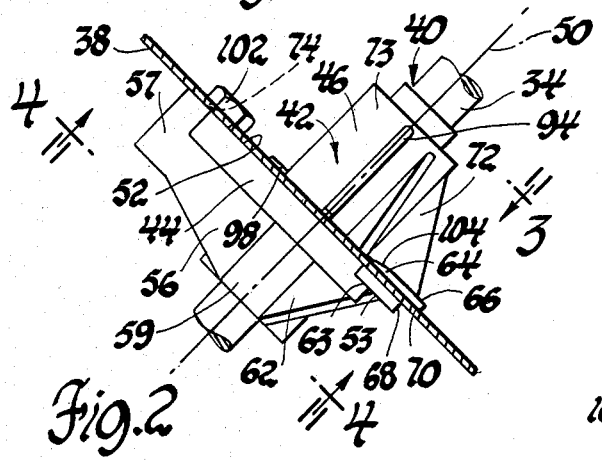
FIG. 2 is a view taken generally along the plane indicated by lines 2—2 in FIG. 1.
Figure 3:
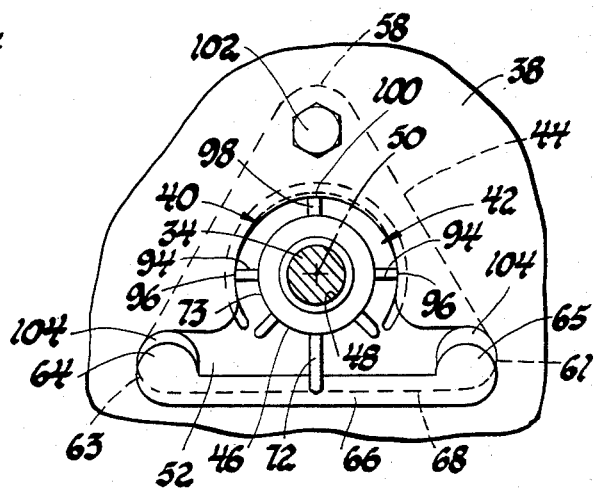
FIG. 3 is a view taken generally along the plane indicated by lines 3—3 in FIG. 2.
Figure 4:
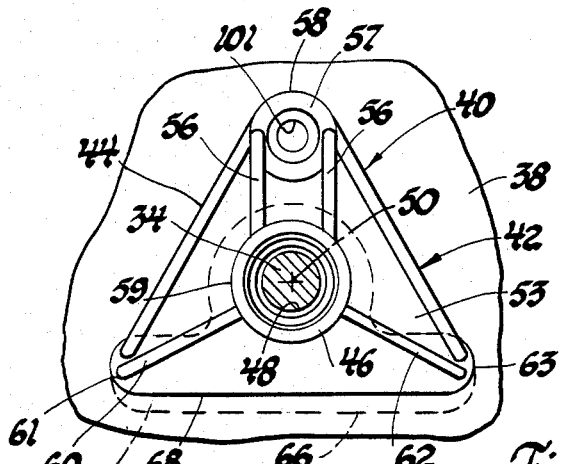
FIG. 4 is a view taken generally along the plane indicated by lines 4—4 in FIG. 2.

Referring now to FIGS. 2, 3 and 4 of the drawings, the left side transmission 40 includes a housing 42 having a triangular base 44 and a tower 46 integral with the base and extending above and below the latter. A bore 48 aligned on an axis 50 of the tower is adapted to mount appropriate bearings, not shown, for supporting the pivot shaft 34 on the housing for rotation about the axis 50. The base 44 has an upper or base surface 52, FIG. 6, and a lower surface 53. A pair of reinforcing struts 56 extend between a boss 57 on the lower surface 53 at a first apex 58 of the triangular base and a lower projecting portion 59 of the tower 46. A second reinforcing strut 60 extends between the lower projecting portion 59 and the lower surface 53 at a second apex 61 of the base and a third reinforcing strut 62 extends between the lower projecting portion 59 and the lower surface 53 at a third apex 63 of the base, FIG. 4.

Figure 6:
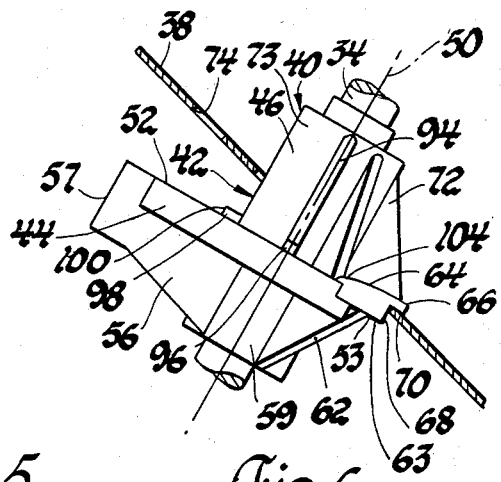
FIG. 6 is a view similar to FIG. 2 but showing the transmission according to this invention in an intermediate position.

As seen best in FIGS. 2, 3 and 6, a pair of generally cylindrical buttons 64 and 65 integral with the base 44 project upwardly from base surface 52 at apexes 63 and 61, respectively, of the base. A lip 66 integral with the buttons extends between the buttons 64 and 65 and overlies an edge 68 of the base 44. The lip 66 has a lower surface 70 which is vertically spaced above the base surface 52 a distance generally corresponding to the thickness of cowl panel 38. A reinforcing strut 72 extends from the lip 66 generally to the top of an upper projecting portion 73 of the tower 46.

Figure 5:
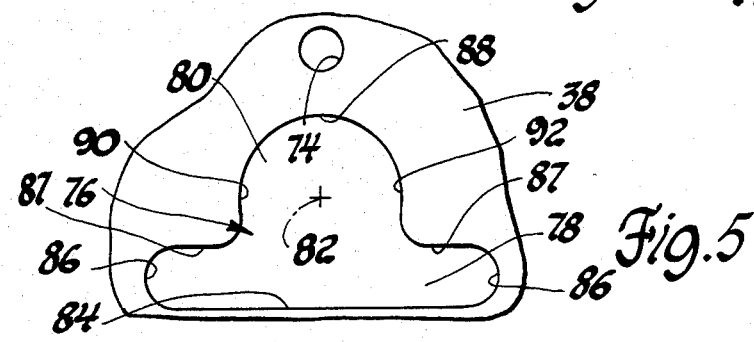
FIG. 5 is a view similar to FIG. 3 but showing only the panel aperture for the transmission according to this invention.

Referring now particularly to FIGS. 2, 5 and 6, a simple aperture 74 and a shaped aperture 76 are formed in the cowl panel for mounting the transmission 40. The shaped aperture 76 includes a generally rectangular portion 78 and a circular portion 80 overlapping the rectangular portion and centered on an axis 82 of the cowl panel. The rectangular portion 78 is defined on one side by a pivot edge 84, at opposite ends by a pair of generally semicircular side edges 86 and on the other side by a pair of back edges 87 extending from the side edges to the overlap between rectangular and circular aperture portions 78 and 80, respectively. The width of rectangular portion 78 corresponds to the diameters of the semi-circular side edges 86 which, in turn, correspond to the diameters of the buttons 64 and 65 and the length of the rectangular portion 78 corresponds to the distance between the buttons. The pivot edge 84 is spaced from the axis 82 in a first direction in the plane of cowl panel 38 a distance corresponding to the spacing between axis 50 and edge 68 on the base 44. On the other side of axis 82 from pivot edge 84, the edge of aperture circular portion 80 defines a first datum edge point 88 directly opposite the pivot edge, a second datum edge point 90 angularly spaced about 90° from the first datum edge point 88, and a third datum edge point 92 likewise angularly spaced about 90° from the first datum edge point 88 but in the opposite direction from the second datum edge point 90. The first, second and third datum edge points 88, 90 and 92, respectively, are equally spaced from the axis 82 by a distance corresponding to the radius of aperture circular portion 80.

As seen best in FIGS. 2, 3 and 6, a pair of reinforcing struts 94 are disposed on opposite sides of the upper projecting portion 73 of the tower 46 generally in a plane containing the axis 50 and taper radially outward from the tower to a corresponding pair of vertical edges 96 which define protuberances extending up from the base surface 52 of the base 44. Similarly, a raised foot 98 extending between the base surface 52 and the tower 46 has a similar vertical edge 100 which defines another protuberance projecting up from the base surface. Each of the vertical edges 96 and 100 are disposed on an imaginary circle centered on axis 50 having a radius generally corresponding to the radius of aperture circular portion 80 in the cowl panel. However, for a purpose explained hereinafter, the radius of the imaginary circle slightly exceeds the radius of the aperture circular portion.

Describing now the installation of the transmission 40 according to this invention, the housing 42 with the pivot shaft 34 disposed in the bore 48 is positioned in the aperture 76 with the upper projecting portion 73 of the tower 46 projecting into the aperture circular portion 80 as shown in FIG. 6. The lip 66 is hooked over the pivot edge 84 of the aperture rectangular portion 78 until the corner defined at the intersection of lower surface 70 of the lip and edge 68 of the base 44 engages the pivot edge 84. The buttons 64 and 65 on the housing are aligned with side edges 86 and the housing 42 is pivoted clockwise, FIG. 6, about the fulcrum defined at the intersection of the lip lower surface and the base edge from an intermediate position, FIG. 6, toward an installed position, FIG. 2, wherein the base surface 52 abuts the underside of the cowl panel 38.

As the housing 42 approaches the installed position the vertical edges 96 and 100 approach the datum edge points 90, 92 and 88, respectively, on the edge of aperture circular portion 80. Also, a bore 101 in the boss 57 approaches alignment with aperture 74 in the cowl panel to a degree sufficient to permit insertion of a single threaded fastener 102 through the aperture 74 into the bore 101. The fasterner 102 is of the self-threading variety so that when rotated it threads itself into the bore until the head of the fastener seats on the upper side of the cowl panel. From this condition, continued rotation of the fastener provides the motive force for pivoting the housing all the way to the installed position.

Because the radius of the imaginary circle containing the vertical edges 96 and 100 exceeds the radius of aperture circular portion 80 in the cowl panel, the vertical edges 96 interfere with the datum edge points 90 and 92 slightly before vertical edge 100 interferes with datum edge point 88. Rotation of the fastener 102 forces the vertical edges 96 between the datum edge points 90 and 92 in interference fit fashion to eliminate any lateral clearance between the housing 42 and the cowl panel. Continued rotation of the fastener 102 then forces the vertical edge 100 into the datum edge point 88 so that tha housing 42 is wedged into the cowl panel between the pivot edge 84 and the datum edge point 88 in interference fit fashion. Accordingly axial clearance between the housing 42 and the cowl panel is eliminated. In addition, each of the buttons 64 and 65 has a rounded portion 104, FIGS. 2, 3 and 6, to avoid interference between back edges 87 and the buttons as the housing pivots to the assembled position. When the housing, then, finally achieves the installed position it is automatically aligned on the cowl panel with axes 50 and 82 coinciding and with base surface 52 abutting the underside of the cowl panel.

It will be apparent from the drawings that the arrangement of the pivot edge 84 relative to the vertical edges 96 and 100 also effectively resists torsional forces on the housing independently of the fastener 102. That is, forces applied at the crank arm 24 have a tendency to rotate or twist the housing 42 about axis 50. The pivot edge 84, wedged against the housing as described, presents a broad, lateral edge to resist such twist. Because the pivot edge 84 is relatively widely spaced from the axis 50 in the installed position of the housing, the force couples on the housing resolve themselves into forces at the pivot edge 84 and at the vertical edges 96 having magnitudes easily manageable by the cowl panel and the material from which the housing 42 is molded.

The embodiments of the invention in which an exclusive property or privilege is claimed are defined as follows:

1. In a mounting for a windshield wiper pivot shaft on a vehicle body panel for rotation about an axis of said panel, the combination comprising, a transmission housing having a base defining a base surface with a tower projecting therefrom, means defining a pivot shaft support bore through said tower on an axis of said housing, aperture means on said panel defining a pivot edge spaced from said panel axis in one direction and a plurality of datum edge points including one datum edge point on the opposite side of said panel axis from said pivot edge and a pair of datum edge points angularly spaced about 90° on opposite sides of said one datum, edge point, means on said housing defining a lip at an edge of said base engageable on said pivot edge and cooperable therewith in defining a fulcrum about which said housing pivots to an installed position wherein said base surface abuts said panel and said tower projects therethrough with said housing axis coinciding with said panel axis, and means defining a plurality of protuberances on said base surface spaced from said housing axis distances generally corresponding to but exceeding the spacing of said datum edge points from said panel axis to effect interference engagement with said plurality of datum edge points in said installed portion of said housing so that movement of said housing parallel to said panel is positively foreclosed.

2. The combination recited in claim 1 further including a single fastener between said panel and said housing operable to prevent pivotal movement of said housing from said installed position.

3. In a mounting for a windshield wiper pivot shaft on a vehicle body panel for rotation about an axis of said panel, the combination comprising, a transmission housing having a base surface with a tower projecting therefrom, means defining a bore through said tower on an axis of said housing for rotatably supporting said pivot shaft, means defining a generally rectangular aperture in said panel having a pivot edge spaced in a first direction from said panel axis, means defining a circular aperture in said panel centered on said panel axis and overlapping said rectangular aperture with a plurality of datum edge points radially spaced from said panel axis including one datum edge point on the opposite side of said panel axis from said pivot edge and a pair of datum edge points angularly spaced about 90° on opposite sides of said one datum edge point, means on said housing defining a lip at an edge of said base engageable on said pivot edge and cooperable therewith in defining a fulcrum about which said housing pivots to an installed position wherein said base surface abuts said panel and said tower projects through said circular aperture with said housing axis coinciding with said panel axis, and means defining a plurality of protuberances on said base surface radially spaced from said housing axis distances generally corresponding to but exceeding the radial spacing of said datum edge points from said panel axis to effect interference engagement with said plurality of datum edge points in said installed position of said housing so that movement of said housing parallel to said panel is positively foreclosed.

4. The combination recited in claim 3 further including a single threaded fastener between said panel and said housing radially outboard of said datum edge points and on the opposite side of said panel axis from said pivot edge operable to prevent pivotal movement of said housing from said installed position.

5. A method of mounting a windshield wiper pilot shaft on a vehicle body panel for rotation about an axis of said panel comprising the steps of forming a transmission housing with a base having a base surface and a tower projecting from said base surface, forming a bore through said tower on an axis of said housing for rotatably supporting said pivot shaft, forming a generally rectangular aperture in said panel having a pivot edge spaced in a first direction from said panel axis, forming a circular aperture in said panel centered on said panel axis and overlapping said rectangular aperture and defining a plurality of datum edge points radially spaced from said panel axis including one datum edge point on the opposite side of said panel axis from said pivot edge and a pair of datum edge points angularly spaced about 90° on opposite sides of said one datum edge point, forming on said housing a lip at an edge of said base engageable on said pivot edge and cooperable therewith in defining a fulcrum for pivoting said housing to an installed position wherein said base surface abuts said panel and said tower projects through said circular aperture with said housing axis coinciding with said panel axis, forming a plurality of protuberances on said base surface radially spaced from said housing axis distances generally corresponding to but exceeding the radial spacing of said datum edge points from said panel axis to effect interference engagement with said plurality of datum edge points in said installed position of said housing, inserting said tower partially through said circular aperture with said base surface angularly spaced from said panel while hooking said lip over said pivot edge, pivoting said housing about said fulcrum to said installed position thereby to bring said protuberances into interference fit engagement with said datum edge points for positively preventing movement of said housing parallel to said panel, and inserting a single threaded fastener through an aperture in said panel into said housing thereby to prevent movement of said housing from said installed position.

* * * * *